United States Patent [19]
Bertoglio et al.

[11] Patent Number: 4,744,629
[45] Date of Patent: May 17, 1988

[54] MULTIFIBER OPTICAL CABLE CONNECTOR

[75] Inventors: Guido Bertoglio, Viganello; Carmelo Foglia, Pazzalo, both of Switzerland

[73] Assignee: Augat Inc., Mansfield, Mass.

[21] Appl. No.: 766,902

[22] Filed: Aug. 16, 1985

[51] Int. Cl.⁴ ............................................. G02B 6/36
[52] U.S. Cl. ................................... 350/96.20; 174/92
[58] Field of Search .............. 350/96.20, 96.21, 96.22, 350/96.23; 174/92; 339/196 R, 208

[56] References Cited

U.S. PATENT DOCUMENTS

| Re. 31,515 | 2/1984 | Heldt | 350/96.21 |
|---|---|---|---|
| 3,377,610 | 4/1968 | Busch et al. | 339/208 X |
| 4,009,931 | 3/1977 | Malsby et al. | 350/96 C |
| 4,047,796 | 9/1977 | Kao et al. | 350/96 C |
| 4,093,341 | 6/1978 | Crick | 350/96.21 |
| 4,101,198 | 7/1978 | Heldt | 350/96.20 |
| 4,114,979 | 9/1978 | Heldt | 350/96.21 |
| 4,134,641 | 1/1979 | Kao et al. | 350/96.21 |
| 4,144,504 | 3/1979 | Leggett et al. | 331/94.5 P |
| 4,146,300 | 3/1979 | Kaiser | 350/96.21 |
| 4,148,557 | 4/1979 | Garvey | 350/96.20 |
| 4,184,739 | 1/1980 | d'Auria et al. | 350/96.15 |
| 4,205,896 | 6/1980 | Borsuk | 350/96.20 |
| 4,208,093 | 6/1980 | Borsuk | 350/96.20 |
| 4,268,115 | 5/1981 | Slemon et al. | 350/96.21 |
| 4,273,412 | 6/1981 | Hillegonds | 350/96.20 |
| 4,330,965 | 5/1982 | Clark | 51/217 R |
| 4,368,948 | 1/1983 | Despouys | 350/96.20 |
| 4,378,954 | 4/1983 | Baker | 350/320 |
| 4,483,584 | 11/1984 | Gresty | 350/96.21 |
| 4,492,060 | 1/1985 | Clark | 51/283 R |
| 4,498,260 | 2/1985 | Doty | 51/217 R |
| 4,509,827 | 4/1985 | Cowen et al. | 350/320 |

FOREIGN PATENT DOCUMENTS

| 0147231 | 7/1985 | European Pat. Off. | 350/96.20 |
|---|---|---|---|
| 2920266 | 12/1979 | Fed. Rep. of Germany | 350/96.20 |

Primary Examiner—Paul Gensler
Assistant Examiner—James C. Lee
Attorney, Agent, or Firm—Weingarten, Schurgin, Gagnebin & Hayes

[57] ABSTRACT

A connector for a multifiber optical cable in which each of the fibers is retained on a common housing which includes receptacle portions for retaining, respectively, a fitting for the cable, and each ferrule to which respective optical fibers are secured. The housing is preferably molded of a plastic material with intergral constituents for retaining the ferrules and cable fitting. The ferrules extend from the housing and can be secured to respective optical connectors or other devices.

10 Claims, 3 Drawing Sheets

MULTIFIBER OPTICAL CABLE CONNECTOR

FIELD OF THE INVENTION

This invention relates to fiberoptic connectors and more particularly to a connector for the interconnection of a multifiber optical cable.

BACKGROUND OF THE INVENTION

Fiberoptic connectors are known for interconnecting a pair of optical fibers in aligned end-to-end disposition to provide optical transmission therebetween. Fiberoptic cables are known in which two or more optical fibers are contained within a single jacket. To interconnect such a multifiber optical cable, each fiber has been secured to a respective connector. The resulting connector assembly is usually cumbersome and the manipulation of the fibers to provide termination of a plurality of fibers in the multifiber cable is often difficult, especially if termination of the multifiber cable is to be accomplished in the field.

SUMMARY OF THE INVENTION

The present invention provides a connector for a multifiber optical cable in which each of the fibers is retained on a common housing to which other optical fibers or opto-electronic devices can be readily attached. The connector includes a housing having a first receptacle portion for receiving and retaining a fitting for the cable, and respective portions each for receiving and loosely retaining the ferrule of respective optical fibers of the cable. The housing is preferably molded of a suitable plastic material with all constituents thereof integrally formed. The plurality of ferrules extending from the connector housing can be secured to respective optical connectors or other devices and aligned therein without restraint by the connector housing since the ferrules are loosely retained by the housing so as not to impair ease of alignment. The novel connector thus provides a single unitary device by which a plurality of fibers are easily terminated.

DESCRIPTION OF THE DRAWINGS

The invention will be more fully understood from the following detailed description taken in conjunction with the accompanying drawings in which.

DETAILED DESCRIPTION OF THE INVENTION

Figure 1:
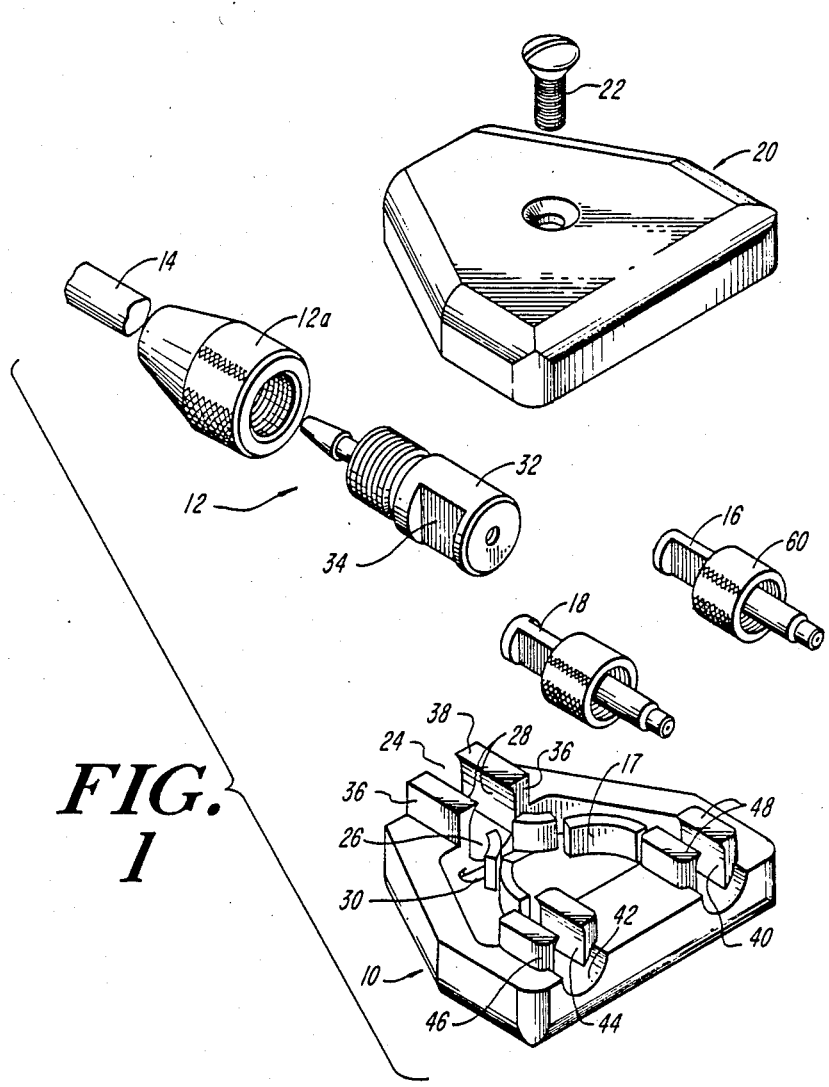
FIG. 1 is an exploded pictorial view of a multifiber optical cable connector embodying the invention.
Figure 2:
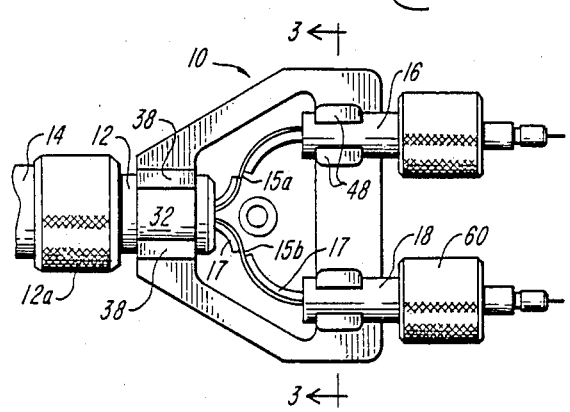
FIG. 2 is plan view of the embodiment of FIG. 1.
Figure 3:
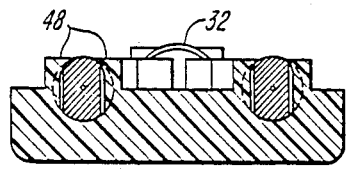
FIG. 3 is a sectional view taken along lines 3—3 of FIG. 2.

The multifiber optic connector housing is shown in FIGS. 1-4 of the drawing for use with a two-fiber cable, and includes a first section 10 to which are secured a cable fitting 12 to which a fiber optic cable 14 is attached, first and second ferrules 16 and 18 to which the optical fibers 15a and 15b are respectively attached, and a cover section 20 cooperative with the first section to maintain the fitting and ferrules in position. The cover is attached to the first section by an appropriate fastener 22 such as the threaded machine screw illustrated. The housing is preferably formed of molded plastic, with the constituents thereof integrally formed therewith.

The first housing section 10 includes at the rearward end thereof a recess 24 having a circular bottom surface 26 and flat wall surfaces 28 and terminating in a transverse recess 30 for accommodating the fitting 12 to which the cable is secured. The fitting 12 includes a cylindrical end portion 32 having flats 34 formed as illustrated, the flats being in slideable engagement with the flat surfaces 28 of the housing recess. A pair of tabs 36 outwardly extend from the flat walls 28 of the recess 24, and include inwardly extending dogs 38 operative to retain the fitting 12 within the recess. The tabs 36 are sufficiently resilient to permit the fitting 12 to be snapped into place in the housing section and to be removed therefrom. When snapped into place, the tabs are sufficiently rigid in the absence of any excess external force to maintain the fitting in place.

The opposite end of the housing section 10 includes recesses 40 for accommodating the respective ferrules 16 and 18, each recess having a curved bottom surface 42 and flat side surfaces 44 cooperative with the confronting surfaces of the respective ferrule. Each recess also includes a pair of outwardly extending tabs 46, each of which include an inwardly extending dog 48, the pair of dogs on each pair of tabs being operative to retain the respective ferrule in the housing section. Thus, the fitting and ferrules are retained in the housing section. Each ferrule is captured in the housing section, but is sufficiently loose to be movable axially and transversely to permit alignment of the ferrule upon insertion into a mating connector.

The housing section 10 also includes outwardly extending guides 17 for the respective optical fibers 15a and 15b to prevent kinking and sharp bending of the fibers. These guides are of sufficient height to closely confront or touch the inner wall of the cover section 20 of the housing.

Figure 4:
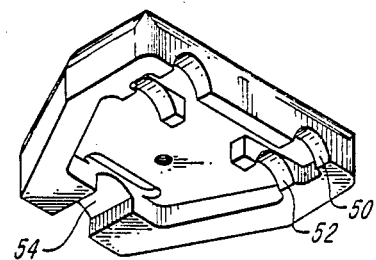
FIG. 4 is a pictorial view of the innerside of the cover member of the housing.

The cover section of the housing is illustrated in FIG. 4 and includes semicircular openings 50 in the end wall thereof and a pair of aligned semicircular openings 52 inward of the first openings and which are configured to fit over the cylindrical surfaces of the ferrules 16,18 when the housing sections are secured together. The opposite end of the cover section includes a cooperative recess 54 which is mateable with the fitting 12 to retain the fitting rigidly in the housing when the housing sections are fastened together. When the sections are fitted together, the ferrules remain loosely captured by the housing so that they are movable for alignment when inserted into a mating connector.

A hex nut is secured within a cooperative recess provided in the housing section 10 to provide a threaded nut cooperative with the machine screw 22 for locking the housing sections together.

The housing parts are molded of plastic, and the metal parts are later affixed to the plastic, therefore the overall assembly is relatively inexpensive to make, since no metal parts have to be molded into place.

Figure 5:
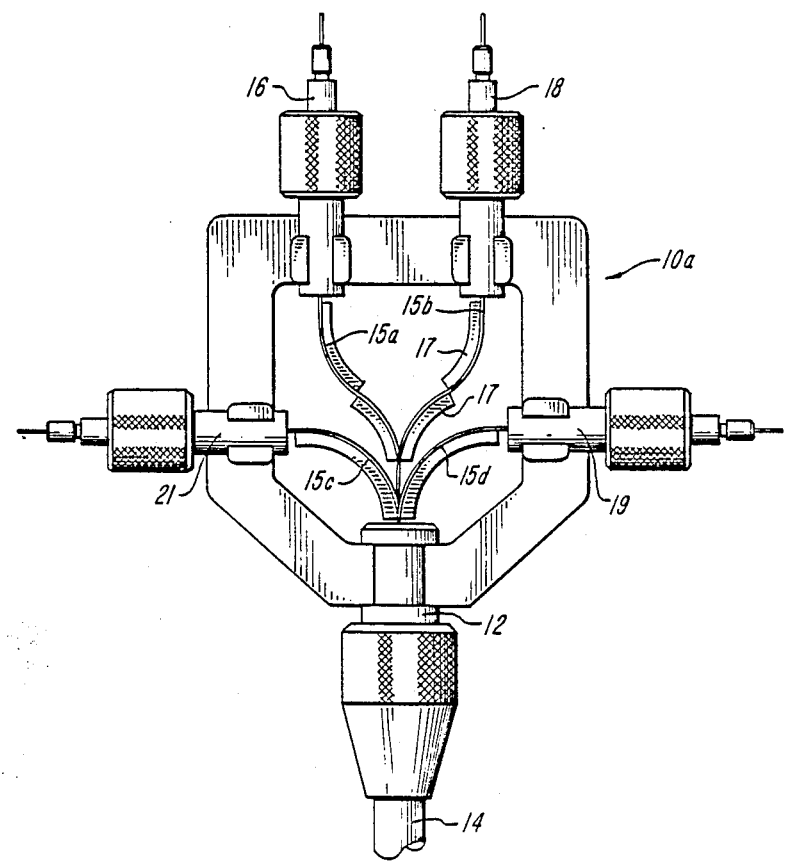
FIG. 5 is a plan view of an alternative embodiment for terminating a four fiber optical cable.

The embodiment described above is for use with a two fiber optical cable. The invention is equally useful for optical cables having more than two fibers. An embodiment of the invention is depicted in FIG. 5 which can be employed for a cable having up to four fibers. In this embodiment, the connector has a housing 10a which is similar to housing 10 of the above-described embodiment but which is modified to accommodate ferrules extending from respective sides of the housing in addition to the ferrules extending outward from the front of the housing. The ferrules 20 and 19 which extend from respective sides of the housing 10a are retained by integrally formed receptacles, which are the same as those described above for retaining the ferrules 16 and 18. Each optical fiber 15a-15d is secured within a respective ferrule. Each ferrule can be connected to an optical connector or other device for coupling signals from its fiber to an associated fiber or other device. Guides 17 are provided as in the above embodiment to prevent undue bending of the fibers.

The housing 10a can be employed with all four ferrules, or can be employed for less than the entire number as the situation may require. Thus the housing can serve as a universal housing for accommodation of one to four optical fibers and associated ferrules.

The fiberoptic cable includes in a typical form an optical fiber having a protective covering thereon usually in the form of one or more plastic layers, and a surrounding jacket, also usually of a plastic material and which may include reinforcing strands longitudinally disposed along the length of the jacket and embedded in the jacket wall. The end of the optical fiber is disposed within a ferrule and has its end disposed and secured within an opening provided in the ferrule tip. The connection of the optical fiber to the ferrule can be accomplished in well-known manner. Typically, the plastic covering on the fiber is stripped from the end portion of the fiber, and the fiber is threaded through the bore of the ferrule, with the stripped end of the fiber extending through the opening in the ferrule tip. The fiber is secured to the ferrule tip by a suitable adhesive and the fiber is then cut flush with the ferrule tip and polished to provide an optically finished end. The cable jacket 14 can be secured to a cooperative fitting in any convenient manner, such as by means of the nipple end of fitting 12 and nut 12a threaded onto the threaded end of fitting 12, as illustrated.

Each ferrule is aligned with a similar ferrule of another optical fiber or electro-optical device for optical coupling therebetween by means of a sleeve into which the confronting ferrules are disposed.

In the illustrated embodiment of FIG. 1, the ferrules 16 and 18 can be plugged into cooperative housings which can include alignment sleeves or other alignment portions for centering each optical fiber within the respective housings for efficient optical transmission. The housing is typically mounted to a panel or other mounting surface via a hole therethrough, each housing having a threaded end cooperative with the locknut 60 of each ferrule by which the ferrule is retained on the housing.

Figure 6:
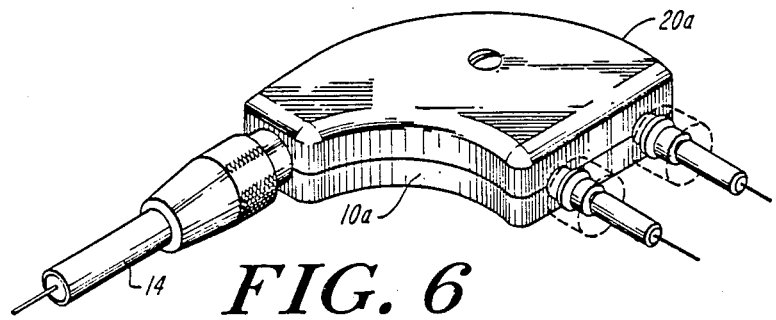
FIG. 6 is a pictorial view of a right angle connector embodiment.
Figure 7:
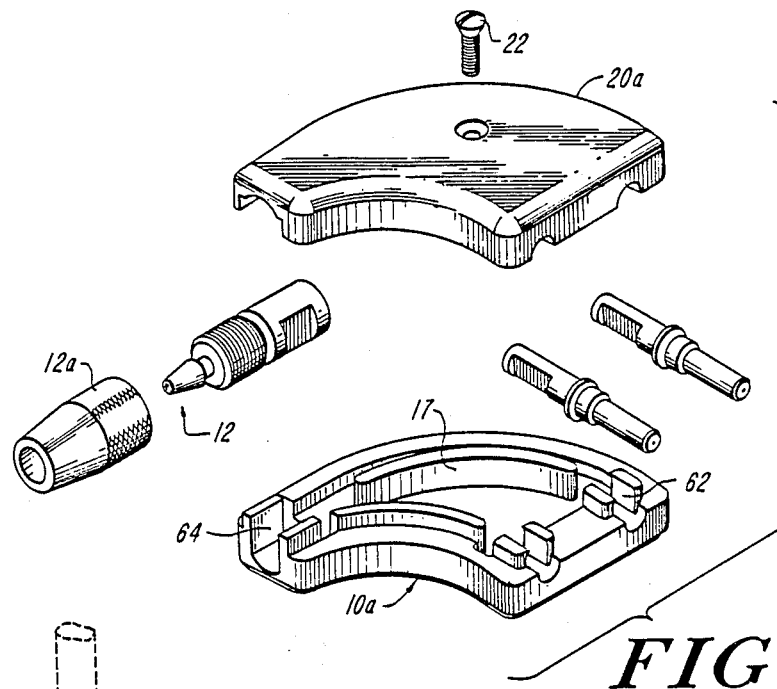
FIG. 7 is an exploded pictorial view of the embodiments of FIG. 6.
Figure 8:
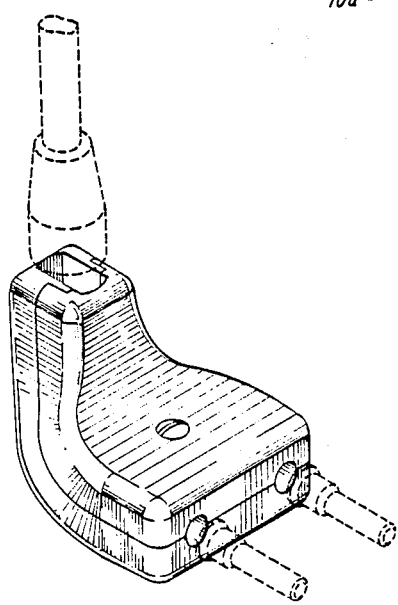
FIG. 8 is a pictorial view of a further right angle connector embodiment.

A further embodiment is shown in FIGS. 6 and 7 which provides a right angle connector for a pair of optical fibers. The housing section 10a includes the receptacles 62 for retention of the respective ferrules, and receptacle 64 for retention of the cable fitting 12, as illustrated. The housing section also includes guides 17 for the respective optical fibers. A further form of right angle connector is shown in FIG. 8 and also includes the integral constituents as described above. The construction of these embodiments is as described above in relation to the constituents of the housing for retaining the ferrules and cable.

It will be appreciated that the invention is not to be limited by what has been particularly shown and described except as indicated in the appended claims.

What is claimed is:

1. A multifiber optical cable connector for receiving a multifiber optical cable secured in a fitting and arranging individual optical fibers thereof, each secured in a ferrule, for subsequent interconnection, comprising:
    a housing having a first unitary section and a second unitary section of dissimilar shape;
    said first unitary section of said housing integrally including
    a first receptacle portion including integral means for engaging external surfaces of the fitting secured to the optical cable to rigidly retain the optical cable in said housing;
    at least two second receptacle portions and wherein each second receptacle portion includes integral means for independently engaging confronting surfaces of the ferrule securing the respective optical fiber of the optical cable to loosely retain the ferrule therein to permit independent alignment thereof by axial and transverse movement of the ferrule with respect to said external surfaces engaging means;
    said second unitary section of said housing having first and second means cooperative with said integral external surfaces engaging means and said integral confronting surfaces engaging means of said first and second receptacle portions, respectively, for rigidly retaining the fitting and loosely retaining each ferrule within said housing with said first and second unitary sections secured together; and
    means for securing said first and second unitary sections of said housing together.

2. The connector of claim 1 wherein said first and second receptacle portions each include a recess having a circular bottom surface and said integral external surfaces engaging means and said integral confronting surfaces engaging means, respectively, of said first and second receptacle portions each further comprise outwardly extending flat wall surfaces and inwardly extending portions on an outer end of each said wall surface to rigidly retain the fitting and loosely retain the ferrules, respectively.

3. The connector of claim 1 wherein said integral external surfaces engaging means of said first receptacle portion includes
    a pair of outwardly extending tabs operative to engage the external surfaces of the cable fitting, and inwardly extending portions at an upper end of each said tab operative to rigidly retain the fitting; and
    wherein said integral confronting surfaces engaging means of said second receptacle portions each include a pair of outwardly extending tabs engaging confronting surfaces of the ferrule, and outwardly extending portions at an upper end of each said tab operative to loosely retain the ferrule;
    said tabs of said second receptacle portions being sufficiently resilient to permit the ferrules to be snapped into place in said first unitary section and to be removed therefrom, and sufficiently rigid to loosely retain each of the ferrules in place therein to permit independent alignment thereof by axial and transverse movement thereof with respect to said tabs.

4. A multifiber optical cable connector for receiving a multifiber optical cable secured in a fitting and arranging individual optical fibers thereof, each secured in a ferrule, for subsequent interconnection, comprising:
  a housing having a first unitary section and a second unitary section of dissimilar shape;
  said first unitary section of said housing integrally including
  a first receptacle portion including a recess and wall surfaces outwardly extending from said recess and wherein said wall surfaces engage external surfaces of the fitting of the optical cable to rigidly retain the optical cable in said housing;
  at least three second receptacle portions each having a recess and outwardly extending wall surfaces independently engaging confronting surfaces of the respective ferrule to which the respective optical fiber is secured to loosely retain the ferrule therein to permit independent alignment thereof by axial and transverse movement thereof with respect to said outwardly extending wall surfaces;
  said second unitary section of said housing having first and second means cooperative with said wall surfaces of said first and second receptacle portions, respectively, for rigidly retaining the fitting and loosely retaining each ferrule within said housing with said first and second unitary sections secured together; and
  means for securing said first and second unitary sections of said housing together.

5. The connector of claim 4 wherein said first unitary section of said housing further comprises a plurality of guides along which individual optical fibers are arranged, and wherein said plurality of guides prevent undue bending of the fibers.

6. The connector of claim 4 wherein each said first and second unitary sections of said housing is an integral molded plastic construction.

7. A multifiber optical cable connector for receiving a multifiber optical cable secured in a fitting and arranging individual optical fibers thereof, each secured in a ferrule, for subsequent interconnection, comprising:
  a first unitary housing section having a first shape and including
  an integral first receptacle portion including means for engaging external surfaces of the fitting secured to the multifiber optical cable to rigidly retain the multifiber optical cable,
  at least two integral second receptacle portions and wherein each said integral second receptacle portion includes means for independently engaging confronting surfaces of the ferrule securing the respective optical fiber of the multifiber optical cable to loosely retain the ferrule therein to permit independent alignment thereof by axial and transverse movement thereof with respect to said confronting surfaces engaging means, and
  a plurality of integral guides forming respective paths between the fitting and each ferrule along which individual optical fibers are disposed;
  a second unitary housing section having a second shape dissimilar to said first shape and integral means cooperative with said first unitary housing section for enclosing and retaining the fitting, ferrules and optical fibers with said first and second unitary housing sections fitted together; and
  means for securing said first and second unitary housing sections together.

8. The connector of claim 7 wherein the securing means includes a threaded fastener.

9. The connector of claim 7 wherein said first unitary housing section includes a recess for retaining a nut; and
  wherein said first unitary housing section further includes an opening for accommodation of a machine screw cooperative with said nut;
  and wherein said machine screw and said nut function as said securing means.

10. The connector of claim 7 wherein said first unitary housing section includes a peripheral portion in which said integral first receptacle portion and said at least two integral second receptacle portions are provided, and a recessed portion containing said plurality of integral guides; and
  wherein said second unitary housing section includes a peripheral portion cooperative with said peripheral portion of said first unitary housing section, and a recessed portion cooperative with said recessed portion of said first unitary housing section.

* * * * *